United States Patent [19]
Ochiai et al.

[11] Patent Number: 5,727,840
[45] Date of Patent: Mar. 17, 1998

[54] MOVABLE PANEL FOR VEHICLE

[75] Inventors: Hironori Ochiai; Katsura Inoue, both of Chiryu, Japan

[73] Assignee: Aisin Seiki Kabushiki Kaisha, Japan

[21] Appl. No.: 796,447

[22] Filed: Feb. 10, 1997

Related U.S. Application Data

[63] Continuation of Ser. No. 569,765, Dec. 8, 1995, abandoned.

[30] Foreign Application Priority Data

Dec. 28, 1994 [JP] Japan ................... 6-327106

[51] Int. Cl.$^6$ ........................................ B60J 7/00
[52] U.S. Cl. ........................... 296/216; 49/501
[58] Field of Search ............ 296/216; 49/490.1, 49/492.1, 501

[56] References Cited

U.S. PATENT DOCUMENTS

| | | | |
|---|---|---|---|
| 4,749,227 | 6/1988 | Bienert et al. | 296/221 |
| 4,892,351 | 1/1990 | Ono et al. | 296/216 X |
| 5,184,870 | 2/1993 | Bauhof | 296/223 |
| 5,409,290 | 4/1995 | Grimm et al. | 296/216 X |
| 5,524,955 | 6/1996 | Brocke et al. | 296/216 |

FOREIGN PATENT DOCUMENTS

| | | | |
|---|---|---|---|
| 3506009 | 8/1986 | Germany . | |
| 3532104 | 4/1987 | Germany . | |
| 3708047 | 10/1988 | Germany | 296/216 |
| 3809458 | 10/1989 | Germany . | |
| 3822721 | 12/1989 | Germany | 296/216 |
| 106718 | 7/1984 | Japan . | |
| 61-193926 | 8/1986 | Japan . | |
| 132421 | 5/1989 | Japan | 296/216 |
| 99424 | 4/1990 | Japan | 296/216 |
| 3-72093 | 7/1991 | Japan . | |
| 2201382 | 9/1988 | United Kingdom | 296/216 |

OTHER PUBLICATIONS

Official Letter dated Feb. 27, 1997 in corresponding German Application No. 195 48 072.4–21 with English translation.

Primary Examiner—Dennis H. Pedder
Attorney, Agent, or Firm—Finnegan, Henderson, Farabow, Garrett & Dunner, L.L.P.

[57] ABSTRACT

A movable panel for a vehicle includes a panel member, a reinforcement member fixed to the panel member and a frame member being fit on a peripheral portion of the panel member. The frame member includes a wall member integrally formed therewith and the wall member engages with an end portion of the reinforcement member which is located inwardly of the peripheral portion of the panel member.

9 Claims, 6 Drawing Sheets

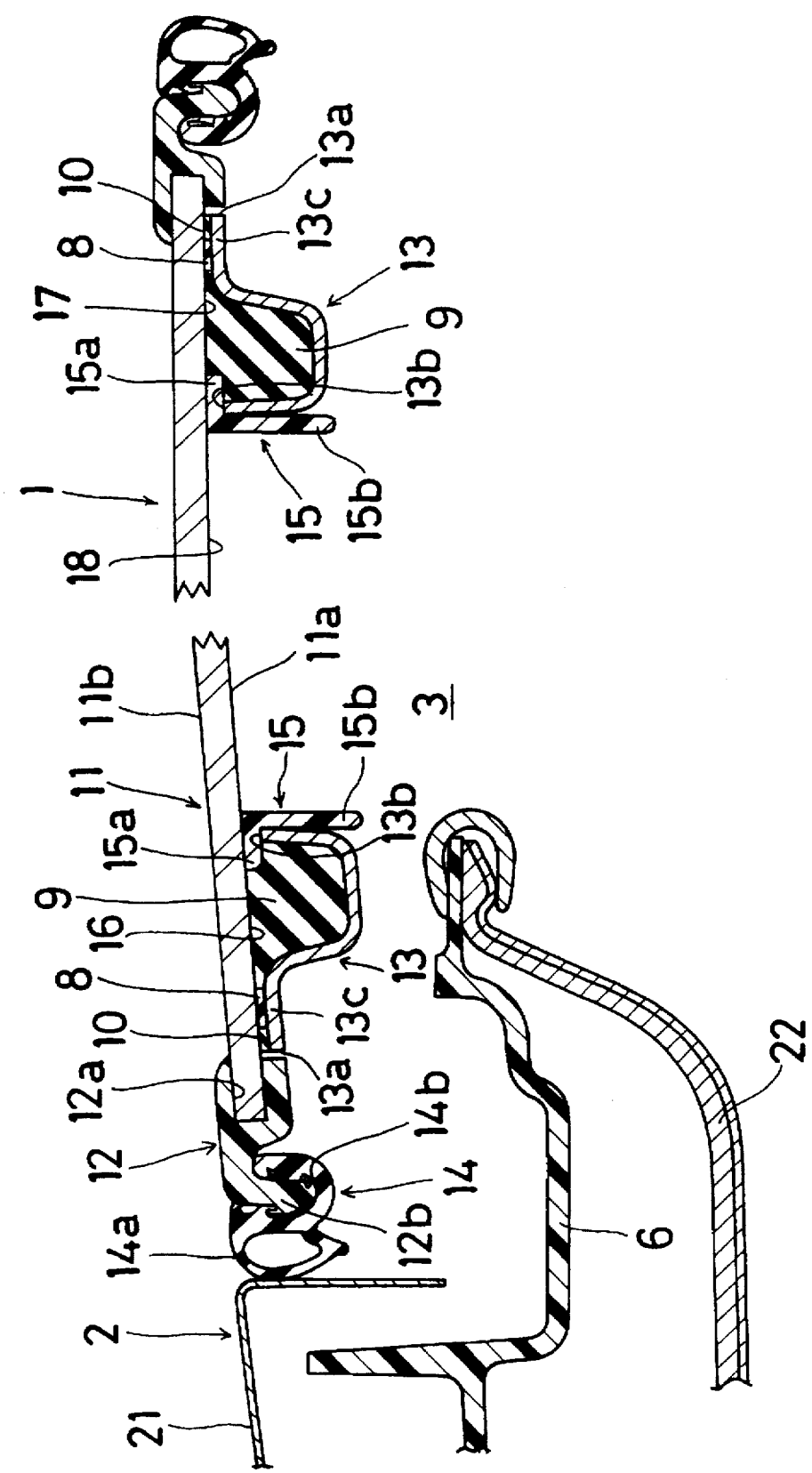

1
MOVABLE PANEL FOR VEHICLE

This application is a continuation of application Ser. No. 08/569,765, filed Dec. 8, 1995, now abandoned.

BACKGROUND OF THE INVENTION

1. Field of the invention

This invention relates to a movable panel for a vehicle and more particularly to a movable panel for a sun-roof apparatus of a vehicle.

2. Description of the Related Art

A conventional movable panel for a vehicle is disclosed in the Japanese Patent Laid-Open No. 61 (1986) -193926. The movable panel for a vehicle disclosed in the publication comprises a panel movably supported on a vehicle roof and a reinforcement member fixed to a peripheral portion of an inside of the panel.

Because an end portion of the reinforcement member of the movable panel for a vehicle is visible by passengers of the vehicle, the movable panel for a vehicle is not attractive.

Another conventional movable panel for a vehicle is disclosed in the Japanese Utility Model Laid-Open No. 59 (1984)-106718. The movable panel for a vehicle comprises a panel and a reinforcement member fixed to a periphery portion of an inside of the panel. The movable panel for a vehicle further comprises a cover member fit on an end of the reinforcement member in order to hide the end of the reinforcement member.

However, the second conventional movable panel for a vehicle is costly to be manufactured since the cover member must be fit on the end of the reinforcement member. Further, the number of the parts of the second conventional movable panel for a vehicle must be increased.

SUMMARY OF THE PRESENT INVENTION

It is an object of the present invention to provide a movable panel for a vehicle which is low in cost in the manufacturing process.

It is another object of the present invention to provide a movable panel for a vehicle which is simple to manufacture.

It is a further object of the present invention to provide a movable panel for a vehicle which can reduce the number of parts thereof.

It is a further object of the present invention to provide a movable panel for a vehicle which is simple in structure and small in size.

It is a further object of the present invention to provide a movable panel for a vehicle which has durability.

To achieve the objects and in accordance with the purpose of the invention, as embodied and broadly described herein, the movable panel for a vehicle of the present invention comprises a panel member having a periphery, a frame member including a frame portion and at least one wall portion formed in one piece with the frame portion so as to form an elongated slot between the frame portion and the wall portion, the frame member being fitted onto the periphery of the panel member, and an elongated, separate reinforcement member disposed through the slot and fixed to the panel member, the reinforcement member having an end portion in contact with the wall portion, and the reinforcement member positioned with respect to the wall portion to eliminate any gap between the end portion of the reinforcement member and the wall portion.

BRIEF DESCRIPTION OF THE DRAWINGS

The features and advantages of the movable panel for a vehicle according to the present invention will be more clearly appreciated from the following description in conjunction with the accompanying drawings wherein:

FIG. 6 is a sectional view of a modification of a movable panel for a vehicle of the present invention corresponding to FIG. 2.

DETAILED DESCRIPTION OF PREFERRED EMBODIMENTS OF THE INVENTION

Figure 1:
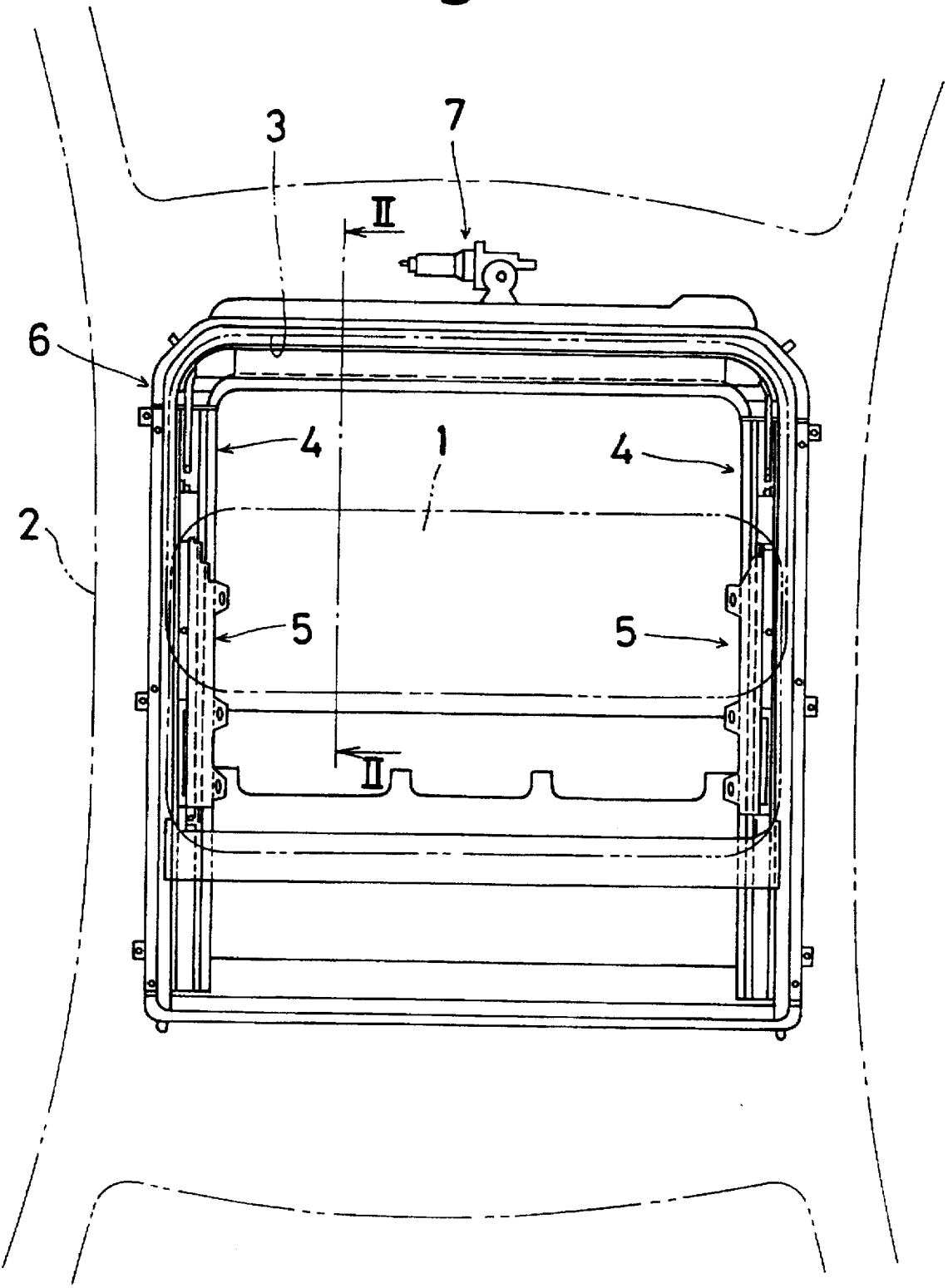
FIG. 1 is a plan view showing a sun-roof apparatus on which a movable panel for a vehicle of the present invention is mounted.
Figure 2:
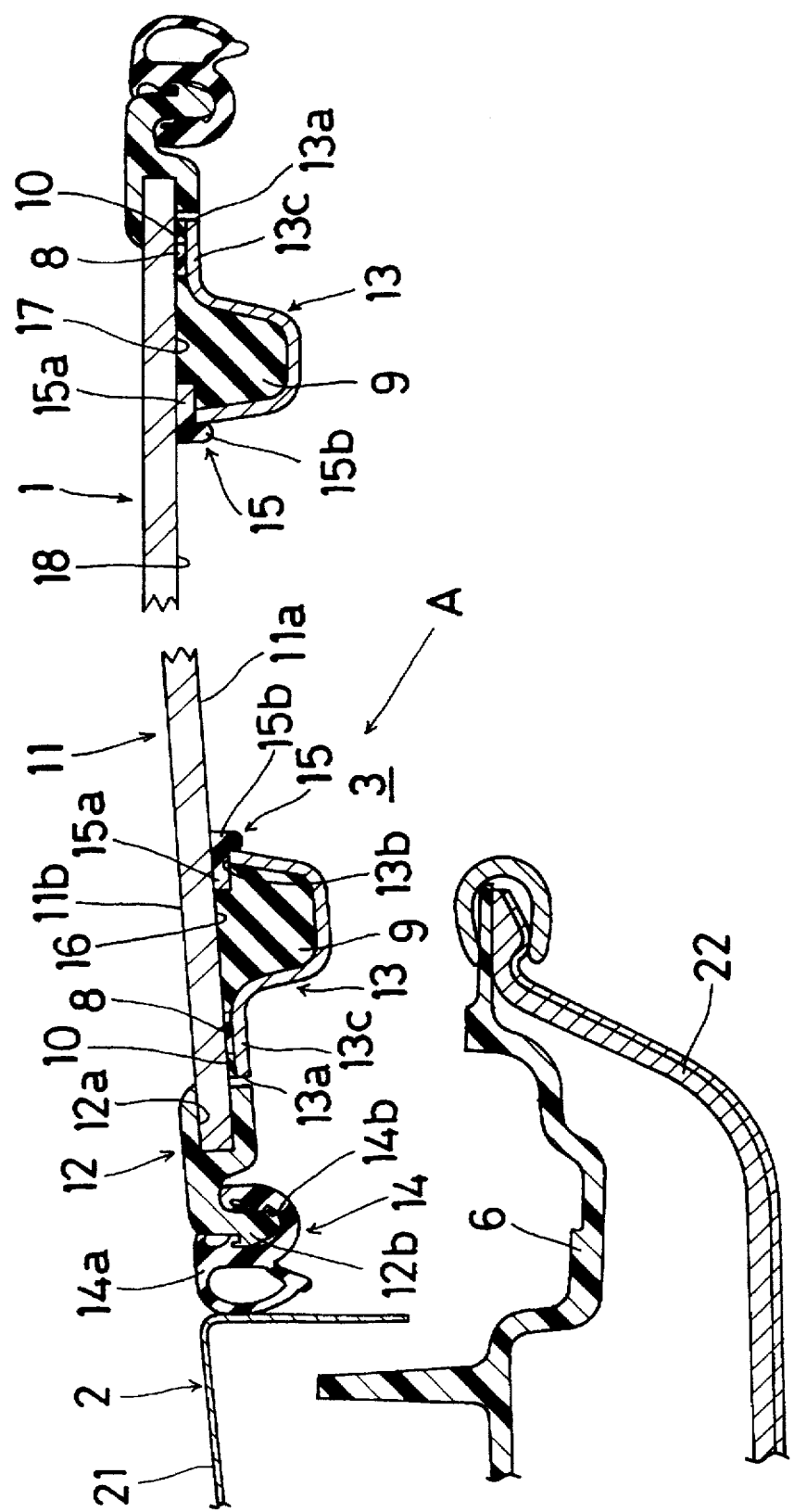
FIG. 2 is a sectional view taken on line II—II of FIG. 1.

With reference to FIGS. 1 and 2, a vehicle roof 2 is formed with a roof panel 21 and a molded roof 22 so as to include an opening 3. A pair of guide rails 4 are fixed to the vehicle roof 2 so as to be extended in the longitudinal direction of the vehicle. Each of the guide rails 4 is located at a side of the opening 3. A movable panel 1 is slidably supported in the longitudinal direction of the vehicle on the guide rails 4 through a pair of link mechanisms 5 (which are conventional) each of which includes a driving shoe, a plurality of links and a bracket in order to open and close the opening 3.

A front frame member 6 connecting the guide rails 4 is fixed to the molded roof 22 so as to be located at a front side of the opening 3. A conventional driving mechanism 7 including an electric motor, a reduction gear and an output gear is mounted on the front frame member 6. The driving mechanism 7 is connected to each of the driving shoes of the link mechanisms 5 through a pair of sliding cables (not shown in Figures).

In accordance with the above structure, when the driving mechanism 7 is operated, the link mechanisms 5 are operated to slide the movable panel 1 through the sliding cables. Therefore, the opening 3 is opened and closed by the movable panel 1.

Figure 3:
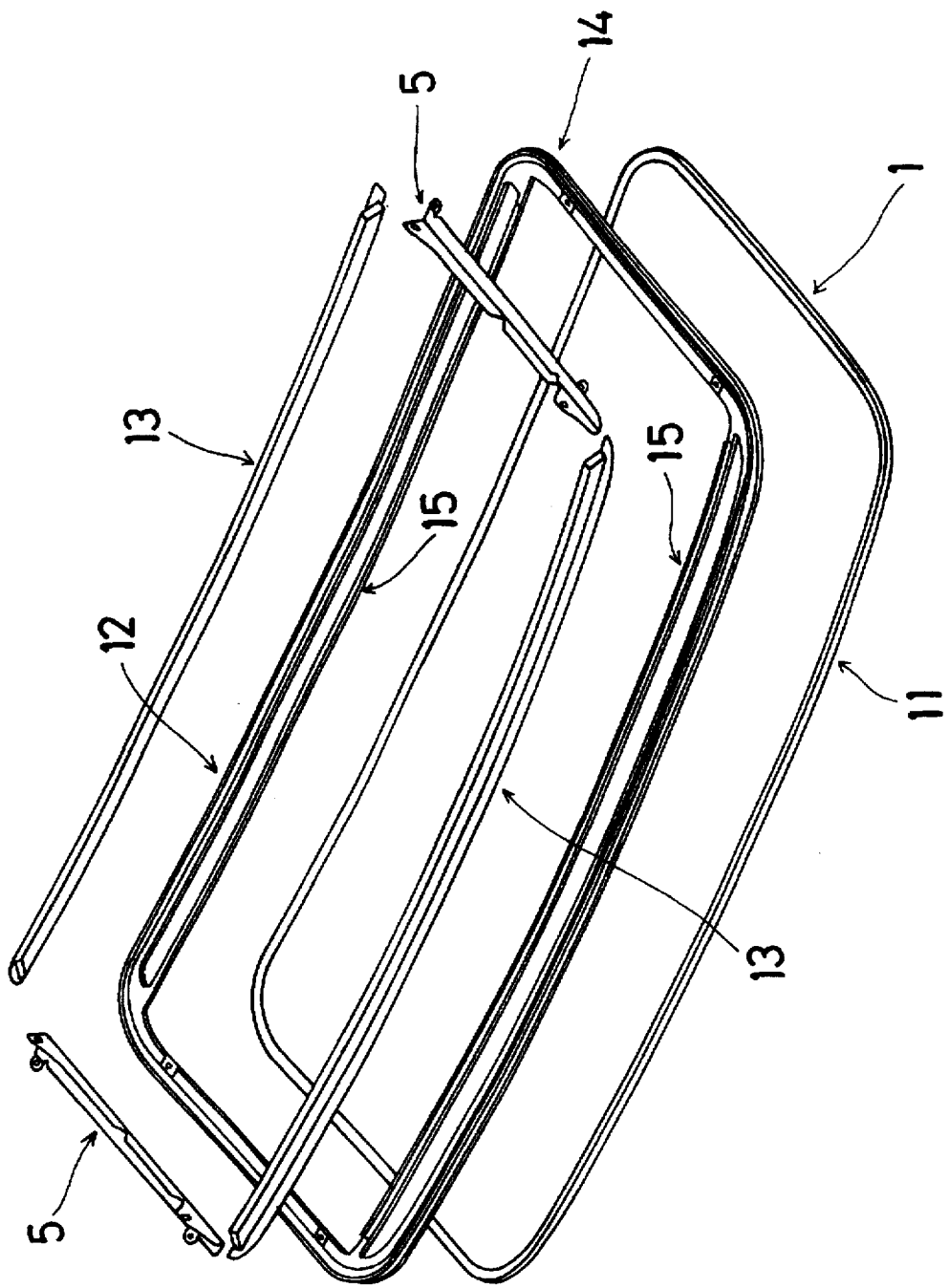
FIG. 3 is an exploded perspective view of a movable panel for a vehicle of the present invention.
Figure 4:
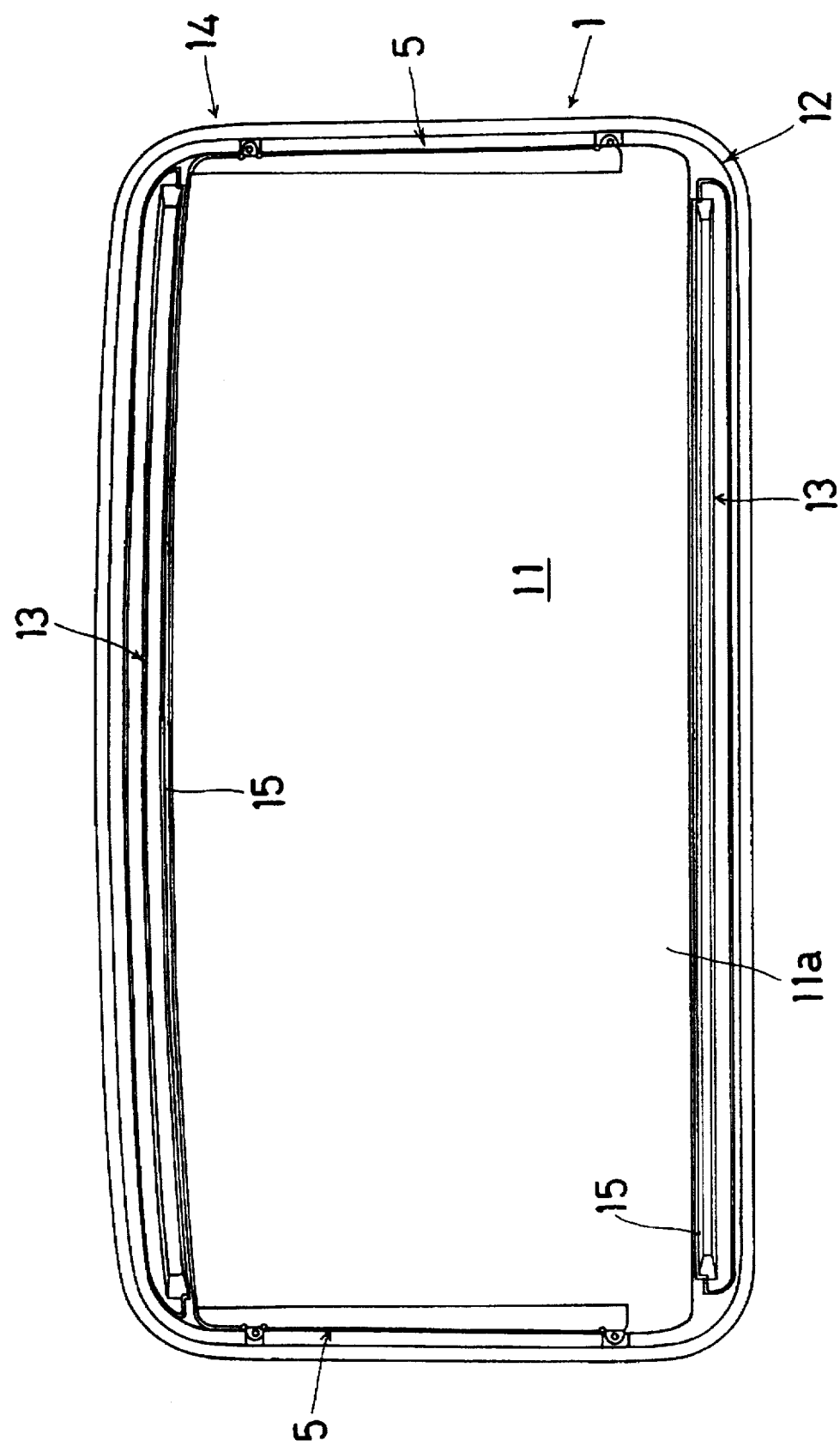
FIG. 4 is a plan view of a movable panel for a vehicle of the present invention with link mechanisms.

With reference to FIGS. 2 to 4, the movable panel 1 is formed with a panel member 11, a frame member 12, a pair of reinforcement members 13 and a weather strip 14.

The panel member 11 is formed of the transparent glass material. The panel member 11 is a plate member formed into the rectangular shaped configuration having a surface area slightly smaller than that of the opening 3. Further, the panel member 11 includes an inside 11a and an outside 11b of the vehicle. The panel member 11 has a curvature which is equal to that of the roof panel 21 in order to connect the outside surfaces of the roof panel 21 and the panel member 11.

Each of the reinforcement members 13 formed of metallic material is extended along a front peripheral portion and a rear peripheral portion of the panel member 11 respectively. Each of the reinforcement member 13 includes end portions 13a, 13b. A portion of the reinforcement member 13 between the end portions 13a, 13b is bent so as to be formed into the rectangular shaped configuration in section shown in FIG. 2. The reinforcement member 13 further includes a fix portion 13c connected to the end portion 13a and which is extended along the inside 11a of the panel member 11.

The weather strip 14 formed of rubber includes a concave portion 14b and a seal portion 14a elastically engaged with the roof panel 21 of the vehicle roof 2 when the movable panel 1 is closed.

The frame member 12 formed of synthetic resin integrally includes a frame portion having a concave portion 12a, a foot portion 12b and a wall portion 15 (described in detail later). The concave portion 12a is fit on the periphery portion of the panel member 11. The foot portion 12b is extended downwardly, and fits into the concave portion 14b of the weather strip 14.

Figure 5:
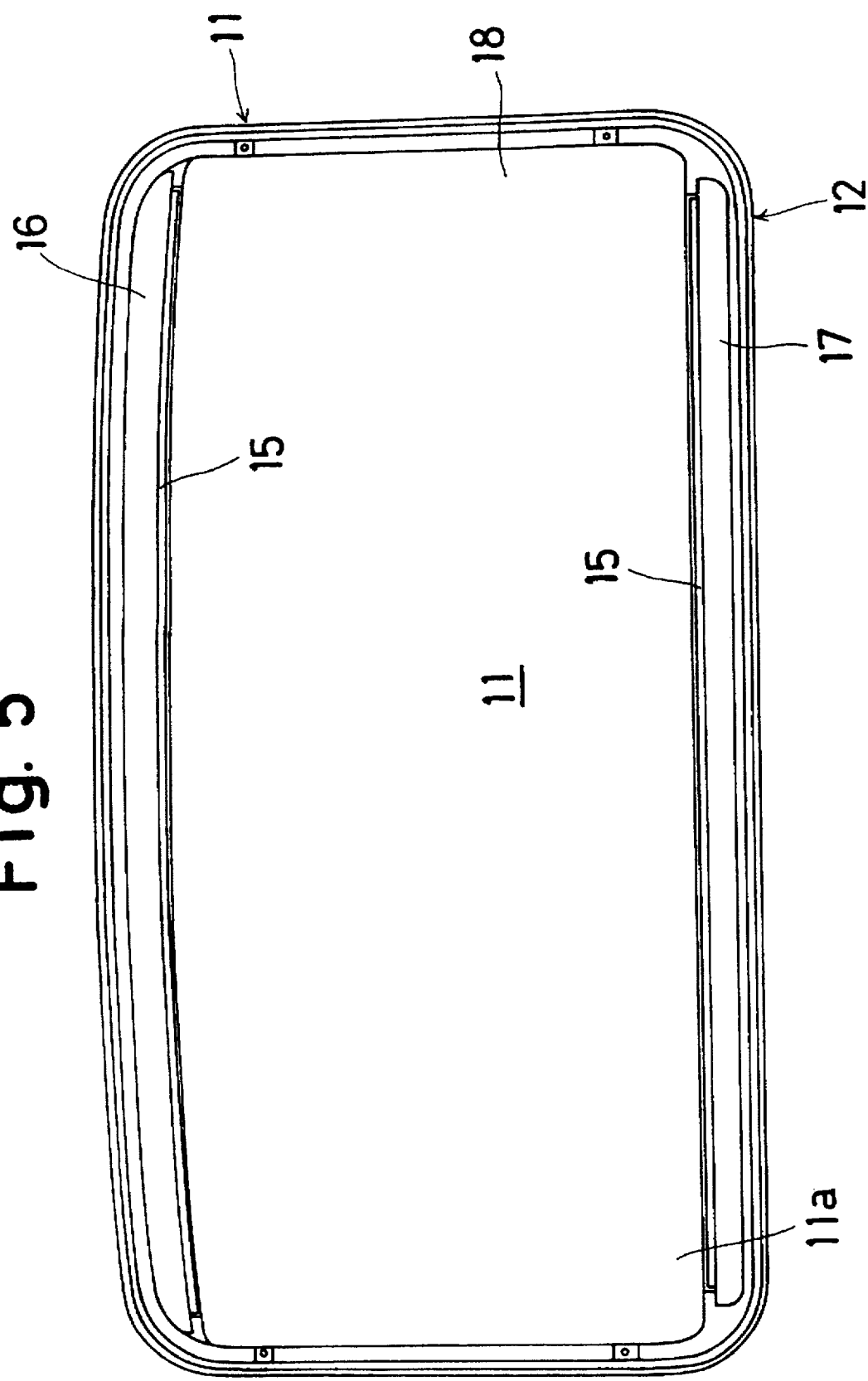
FIG. 5 is a plan view of a panel member with a frame member of a movable panel for a vehicle of the present invention.

The frame member 12 is integrally formed with the panel member 11 by insert molding so as to fit the concave portion 12a on the panel member 11 as shown in FIGS. 4 and 5.

With reference to FIGS. 2 to 5, each of the wall portions 15 includes a fix portion 15a and a wall 15b so as to be formed into an L-shaped configuration. Each of the wall portions 15 is extended along the front peripheral portion and the rear peripheral portion of the panel member 11 respectively so as to connect with a left side member and a right side member of the frame member 12. Each of the wall portions 15 is spaced apart from a front side member and a rear side member of the frame member 12 respectively. Therefore, the wall portions 15 divide the panel member 11 into a pair of mounting portions 16, 17 for the reinforcement members 13 and a window portion 18.

The reinforcement members 13 are glued to the mounting portions 16 and 17 respectively by glue 8, 9 and reversible adhesive tapes 10 between the inside 11a of the panel member 11 and the fix portions 13c of the reinforcement members 13 so as to engage the end portions 13b with the wall portions 15. In accordance with the above structure, the end portions 13b are hidden by the walls 15b in order not to be visible from A (in a compartment of the vehicle as shown in FIG. 2). On the other hand, a surface of each of the end portions 13a is connected with a surface of the frame member 12.

The glue 8 and the adhesive tape 10 are applied between all of the fix portion 13c of the reinforcement member 13 and the panel member 11. The glue 9 is applied to several portions between each of the reinforcement members 13 and the panel member 11.

In accordance with the above structure, since the reinforcement member 13 is directly glued to the panel member 11, the reinforcement member 13 is tightly fixed to the panel member 11 by the glue 8, 9 relative to gluing the reinforcement member 13 to the frame member 12. Further, the appropriate glue 8, 9 can be easily selected. Furthermore, since the glue 8, the adhesive tape 10 and the fix portion 13c are disposed within a thickness of the frame member 12, the thickness of the movable panel 1 can become small.

The mounting portions 16, 17 are coated with ceramic coating and the like in order that the reinforcement 13 and the like are not visible from the outside of the vehicle.

In accordance with the above structure, because each of the end portions 13b of the reinforcement 13 is hidden by the wall portion 15 integrally formed as part of the frame member 12 so as not be visible from the compartment of the vehicle, a cover member does not have to be fit on the end portion 13b of the reinforcement member 13. Therefore, the movable panel 1 can be low in cost in the manufacturing process.

Further, since the end portion 13b of the reinforcement member 13 is engaged with the fix portion 15a of the wall portion 15, the reinforcement member 13 can be located by the wall portion 15. Thus, the wall 15b can absorb variations of distance between the end portion 13b of the reinforcement member 13 and the panel member 11.

Furthermore, because the end portion 13b of the reinforcement member 13 is engaged with the fix portion 15a of the wall portion 15, the reinforcement member 13 is prevented from being in contact with the panel member 11. Therefore, any noise or flaw of the panel member 11 generated by interference of the reinforcement member 13 with the panel member 11 can be reduced.

As shown in FIG. 6, the wall 15b of the wall portion 15 may be extended from the end portion 13b so as to hide all of the reinforcement member 13. In accordance with the above structure, the movable panel 1 can become further attractive.

The reinforcement member 13 may be disposed at one of the front and rear periphery portions of the panel member 11. In accordance with such structure, the wall portion 15 is also disposed at one of the front and rear peripheral portions of the panel member 11.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A movable panel for a vehicle comprising:

a panel member having a periphery;

a frame member including a frame portion and at least one wall portion formed in one piece with the frame portion so as to form a slot elongated adjacent a front edge of the panel member between the frame portion and the wall portion, the frame member being fitted onto the periphery of the panel member; and a separate reinforcement member disposed through the slot and fixed to the panel member, the reinforcement member being elongated adjacent the front edge of the panel member and having an end portion in contact with the wall portion, and the reinforcement member positioned with respect to the wall portion to eliminate any gap between the innermost extent of the end portion of the reinforcement member and the wall portion.

2. A movable panel for a vehicle as recited in claim 1, wherein the wall portion is spaced from the frame portion so as to divide the panel member into a window portion and a mounting portion between the frame portion and the wall portion.

3. A movable panel for a vehicle as recited in claim 1, wherein the innermost extent of the end portion of the reinforcement member includes a tip, and the wall portion includes a fix portion with which the tip is engaged and a wall that covers the innermost extent of the end portion of the reinforcement member, the fix portion and the wall being formed in an L-shaped configuration.

4. A movable panel for a vehicle as recited in claim 1, wherein the wall portion is vertically along an end portion of the reinforcement member so as to cover the reinforcement member.

5. A movable panel for a vehicle comprising:

a panel member having a periphery;

a frame member including a frame portion and two wall portions formed in one piece with the frame portion so as to form two slots, each slot elongated adjacent one of a front edge and a rear edge of the panel member between the frame portion and each wall portion, the frame member being fitted onto the periphery of the panel member; and two separate reinforcement members, each disposed through one of the slots and fixed to the panel member, each reinforcement member being elongated adjacent one of the front edge and rear edge of the panel member and having an end portion in contact with the wall portion, and each reinforcement member positioned with respect to the wall portion to eliminate any gap between the innermost extent of the end portion of each reinforcement member and the wall portion.

6. A movable panel for a vehicle comprising:

a panel member having a periphery;

a frame member including a frame portion and at least one wall portion formed in one piece with the frame portion so as to form a slot elongated adjacent a front edge of the panel member between the frame portion and the wall portion, the frame being fitted onto the periphery of the panel member;

a weatherstripping in contact with said frame portion; and a separate reinforcement member disposed through the slot and fixed to the panel member, the reinforcement member being elongated adjacent the front edge of the panel member and having an end portion in contact with the wall portion, and the reinforcement member positioned with respect to the wall portion so as to be free of direct contact with the weatherstripping.

7. A movable panel for a vehicle comprising:

a panel member having a periphery;

a frame member including a frame portion and two wall portions formed in one piece with the frame portion so as to form two slots, each slot elongated adjacent one of a front edge and a rear edge of the panel member between the frame portion and each wall portion, the frame member being fitted onto the periphery of the panel member;

weatherstripping in contact with said frame portion; and two elongated, separate reinforcement members, each disposed through one of the slots and fixed to the panel member, each reinforcement member having an end portion in contact with the wall portion, and each reinforcement member positioned with respect to the wall portion so as to be free of direct contact with the weatherstripping.

8. A movable panel for a vehicle comprising:

a panel member having a periphery;

a frame member including a frame portion and at least one wall portion formed in one piece with the frame portion so as to form a slot elongated adjacent a rear edge of the panel member between the frame portion and the wall portion, the frame being fitted onto the periphery of the panel member; and a separate reinforcement member disposed through the slot and fixed to the panel member, the reinforcement member being elongated adjacent the rear edge of the panel member and having an end portion in contact with the wall portion, and the reinforcement member positioned with respect to the wall portion to eliminate any gap between the innermost extent of the end portion of the reinforcement member and the wall portion.

9. A movable panel for a vehicle comprising:

a panel member having a periphery;

a frame member including a frame portion and at least one wall portion formed in one piece with the frame portion so as to form a slot elongated adjacent a rear edge of the panel member between the frame portion and the wall portion, the frame being fitted onto the periphery of the panel member;

a weatherstripping in contact with said frame portion; and a separate reinforcement member disposed through the slot and fixed to the panel member, the reinforcement member being elongated adjacent the rear edge of the panel member and having an end portion in contact with the wall portion, and the reinforcement member positioned with respect to the wall portion so as to be free of direct contact with the weatherstripping.

* * * * *

UNITED STATES PATENT AND TRADEMARK OFFICE
CERTIFICATE OF CORRECTION

PATENT NO.: 5,727,840

DATED: March 17, 1998

INVENTOR(S): Ochiai et al.

It is certified that an error appears in the above-identified patent and that said Letters Patent is hereby corrected as shown below:

In Claim 4, column 4, line 58, after "vertically", insert --extended--.

Signed and Sealed this

Twenty-sixth Day of May, 1998

Attest:

BRUCE LEHMAN

Attesting Officer

Commissioner of Patents and Trademarks